United States Patent [19]

de Vrieze

[11] Patent Number: 5,002,016
[45] Date of Patent: Mar. 26, 1991

[54] DEVICE FOR COLLECTING EGGS

[75] Inventor: Luc N. de Vrieze, St. Jan in Eremo, Belgium

[73] Assignee: Elite N.V., Maldegem, Belgium

[21] Appl. No.: 434,306

[22] Filed: Nov. 13, 1989

[30] Foreign Application Priority Data

Nov. 11, 1988 [NL] Netherlands .......................... 8802777

[51] Int. Cl.$^5$ ............................................ A01K 31/14
[52] U.S. Cl. ...................................... 119/48; 198/449; 198/435
[58] Field of Search .................. 119/48; 198/449, 435, 198/607, 801, 803.13, 803.14

[56] References Cited

U.S. PATENT DOCUMENTS

| | | | |
|---|---|---|---|
| 2,144,547 | 1/1939 | Robinson et al. | 198/801 |
| 2,667,262 | 1/1954 | Davis | 198/803.14 X |
| 2,714,257 | 8/1955 | Reading | 198/803.14 X |
| 3,032,170 | 5/1962 | Elkington | 198/803.14 X |
| 3,044,601 | 7/1962 | Ellis | 198/803.14 X |
| 3,722,743 | 3/1973 | Atchley | 198/801 X |
| 3,770,107 | 11/1973 | Michelbach | 119/48 X |
| 3,789,802 | 2/1974 | Conley | 119/48 |
| 4,159,696 | 7/1979 | Martin | 198/803.14 X |
| 4,199,051 | 4/1980 | Kimberley | 119/48 X |
| 4,293,066 | 10/1981 | Kennedy et al. | 198/813 |
| 4,317,514 | 3/1982 | Noren | 198/803.13 |

FOREIGN PATENT DOCUMENTS 6918434 8/1970 Netherlands .

OTHER PUBLICATIONS

"Standard Search Report" cover sheet (2 pages) from Foreign Patent Office.

Primary Examiner—Gene Mancene
Assistant Examiner—R. Thomas Price
Attorney, Agent, or Firm—William D. Blackman; Arnold S. Weintraub

[57] ABSTRACT

A device for the collection of eggs includes a number of egg conveyor belts lying above one another, an egg discharge belt and a device disposed between the egg conveyor belts and the egg discharge belt for transferring eggs from the egg conveyor belts to the egg discharge belt. The transfer device includes an essentially vertically arranged endless egg conveyor which at the top and bottom thereof is guided over reversing mechanisms. The egg conveyor has a first part which can move up past the ends of egg conveyor belts, and a second part which can move down past the egg discharge belt.

The egg conveyor is provided with egg accommodation elements disposed abutting one after the other in the lengthwise direction of the egg conveyor, the egg accommodation elements being essentially U-shaped, when viewed in the transverse direction of the egg conveyor, and open towards the outside, and extending over the width of the egg conveyor. The egg accommodation elements are divided by means of separating elements into a number of individual adjacent compartments, the separating elements lying one after the other in the lengthwise direction of the egg conveyor, and the width of the compartments being such that only one egg fits into each compartment. The egg conveyor is arranged in such a way that the eggs fed in by a particular egg conveyor belt can be accommodated in only one specific row of compartments lying one after the other in the lengthwise direction of the egg conveyor.

15 Claims, 7 Drawing Sheets

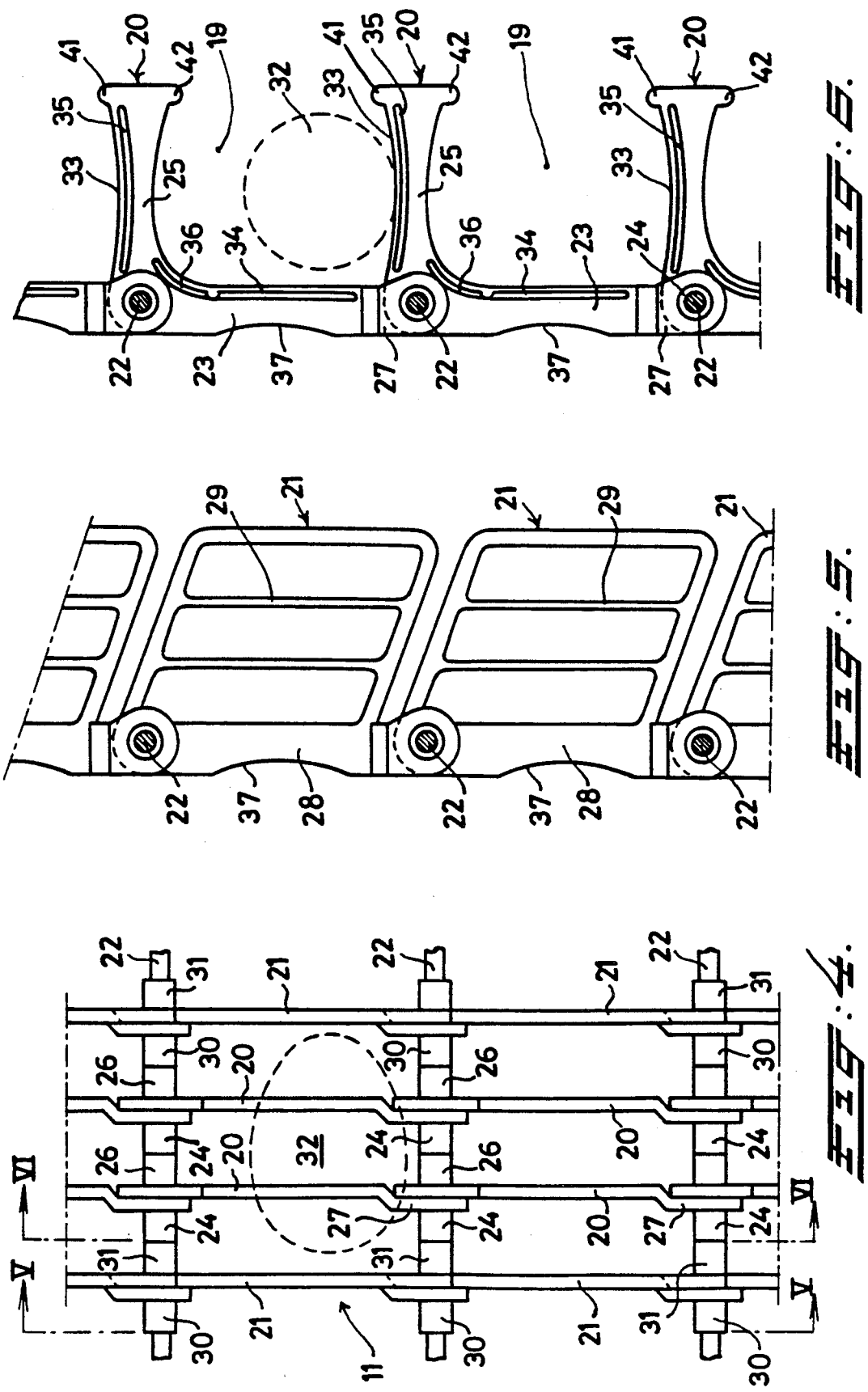

DEVICE FOR COLLECTING EGGS

BACKGROUND OF THE INVENTION

The present invention relates to a device for collecting eggs in hen laying batteries.

In modern hen laying batteries egg collection and conveyor belts extend in front of the cages in which the hens are kept for automatic transportation of the eggs from the cages to a collection point. Since the cages are arranged in levels lying vertically above one another, the egg conveyor belts also lie essentially vertically above one another. It is therefore necessary to provide a collection mechanism which picks up the eggs at different levels. The mechanism then transports the eggs to a discharge conveyor, which generally extends at right angles to the lengthwise direction of the conveyor belts and which conveys the eggs to a central processing point.

Various devices are known for transferring the eggs from the egg conveyor belts lying above one another to the egg discharge belt, for example the device described in U.S. Pat. No. 4,199,051. This known device comprises an essentially vertically arranged endless egg conveyor which is guided over reversing mechanisms at the top and bottom side. The conveyor is provided with egg accommodation elements disposed abutting one after the other in the lengthwise direction of the conveyor and essentially U-shaped, viewed in the transverse direction of the conveyor, and open towards the outside, and extending over the width of the conveyor. One part of the conveyor moves up past the ends of the egg conveyor belts, so that the eggs brought in by the egg conveyor belts can be taken into the accommodation elements. The eggs taken into the accommodation elements are guided over the top reversing mechanism and conveyed downwards at the other side by the downward moving part of the egg conveyor. An egg discharge belt is arranged next to the downward moving part of the egg conveyor, and the eggs are transferred from the accommodation elements of the conveyor to the egg discharge belt by means of a special removal mechanism and are conveyed further by the egg discharge belt.

The disadvantage of the known device lies in the fact that eggs fed in by different egg conveyor belts can go into the same accommodation element of the egg conveyor. This can lead to the eggs being damaged due to the eggs knocking against each other in the accommodation element. This problem occurs particularly when the egg conveyor belts lie vertically above one another and the eggs brought in by these egg conveyor belts would arrive at virtually the same place in the accommodation element.

SUMMARY OF THE INVENTION

The object of the present invention is to eliminate this problem and to provide a device for the collection of eggs in which the chance of damage to the eggs is minimized, and which is also simple in design.

This object is achieved according to the invention by a device for the transfer of eggs from a number of egg conveyor belts disposed above one another to an egg discharge belt, comprising an essentially vertically arranged endless egg conveyor which is guided over reversing mechanisms at the top and bottom side, and which is provided with egg accommodation elements disposed abutting one after the other in the lengthwise direction of the egg conveyor and being essentially U-shaped, viewed in the transverse direction of the egg conveyor, and open towards the outside of the egg conveyor, and extending over the width of the egg conveyor, said egg accommodation elements being divided by means of separating elements into a number of individual adjacent compartments, the separating elements lying one after the other in the lengthwise direction of the egg conveyor, and the width of the compartments being such that only one egg fits into each compartment.

Through these measures a number of rows—lying adjacent to each other in the transverse direction of the egg conveyor—of compartments lying one after the other in the direction of movement of the egg conveyor are formed, with only one egg fitting into each compartment. The eggs lie in the egg accommodation elements separated from each other by the separating elements, and the eggs cannot therefore be damaged any more by knocking against each other.

The object of the invention is also achieved by a device for the collection of eggs, comprising a number of egg conveyor belts lying above one another, an egg discharge belt and a transfer device disposed between the egg conveyor belts and the egg discharge belt for transferring eggs from the egg conveyor belts to the egg discharge belt, said transfer device comprising an essentially vertically arranged endless egg conveyor which at the top and bottom side is guided over reversing mechanisms, and has a first part which can move up past the ends of egg conveyor belts and a second part which can move down past the egg discharge belt, and is provided with egg accommodation elements disposed abutting one after the other in the lengthwise direction of the egg conveyor and being essentially U-shaped, viewed in the transverse direction of the egg conveyor, and open towards the outside, and extending over the width of the egg conveyor, said egg accommodation elements being divided by means of separating elements into a number of individual adjacent compartments, the separating elements lying one after the other in the lengthwise direction of the egg conveyor, and the width of the compartments being such that only one egg fits into each compartment, and said egg conveyor being arranged in such a way that the eggs fed in by a particular egg conveyor belt can be accommodated in only one particular row of compartments lying one after the other in the lengthwise direction of the egg conveyor.

A high egg collection capacity can be achieved with this device due to the fact that the eggs brought in by different egg conveyor belts are accommodated simultaneously in different adjacent rows of compartments. Moreover, a free compartment is always available for each egg brought in, so that no waiting times occur and there is no risk of eggs brought in by an egg conveyor belt knocking against waiting eggs. It is also possible to count separately the eggs brought in by a particular egg conveyor belt.

In particular, where the egg conveyor belts are situated vertically above one another, the egg conveyor lies slanting relative to the vertical in a plane parallel to the plane through the first part of the egg conveyor, at such an angle that the eggs of two egg conveyor belts lying above one another go into two adjacent rows of compartments of the egg conveyor.

Further features of the device according to the invention are found in the sub-claims and are explained in greater detail in the example of an embodiment which follows with reference to the drawings.

BRIEF DESCRIPTION OF THE DRAWINGS

FIG. 4 is a view of a part of the egg conveyor for a device according to the invention;

FIG. 5 is a view along the line V—V in FIG. 4;

FIG. 6 is a view along the line VI—VI in FIG. 4;

DETAILED DESCRIPTION OF A PREFERRED EMBODIMENT

Figure 1:
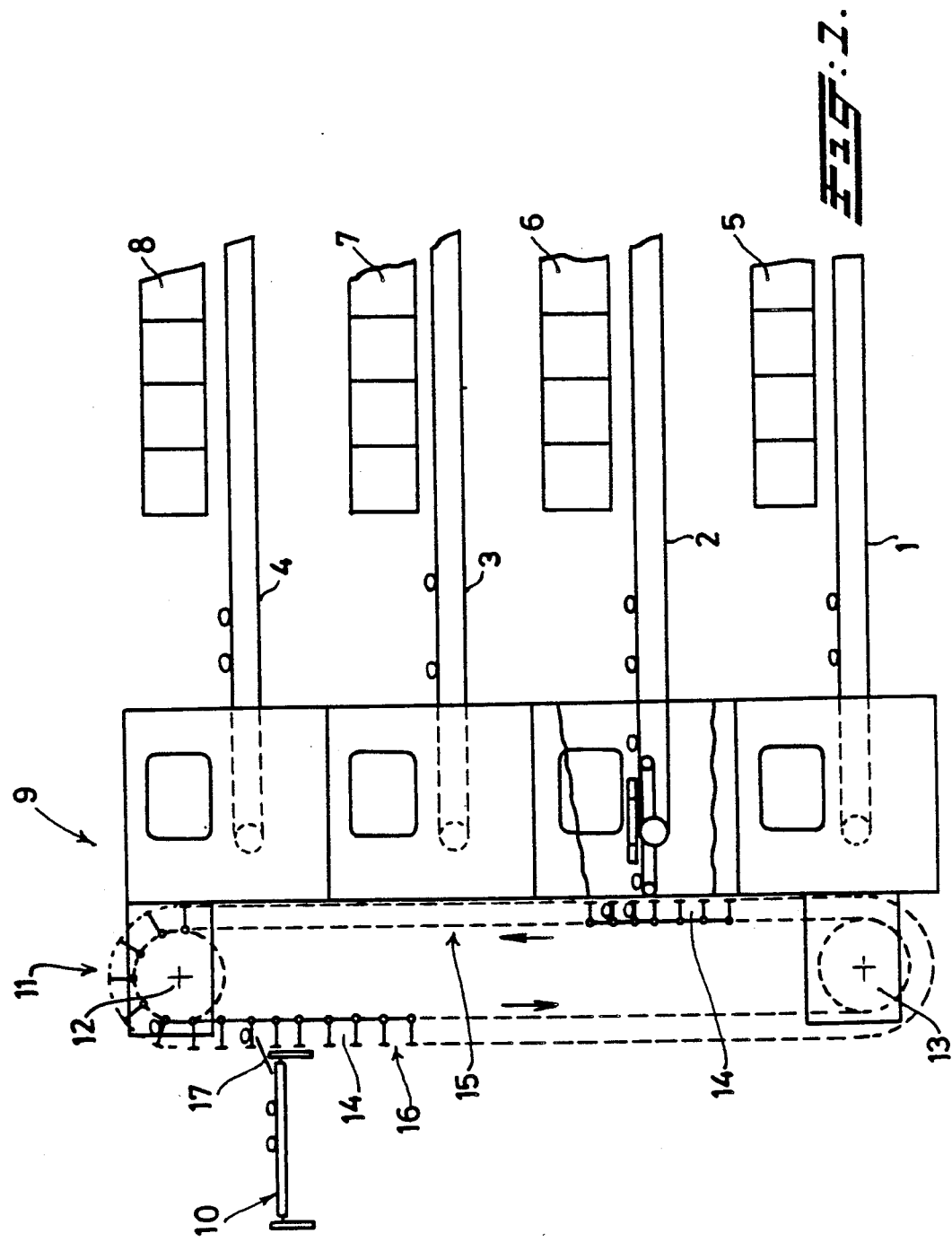
FIG. 1 is a schematic view of a device for the collection of eggs according to the invention.

FIG. 1 shows a device for the collection of eggs according to the invention.

The device shown comprises four egg conveyor belts 1 to 4 lying one above the other. By means of these egg conveyor belts eggs can be conveyed out of a laying battery, comprising four rows of cages 5 to 8 placed one above the other and containing hens, to a device in which the eggs are handled further. FIG. 1 shows such a device, indicated in its entirety by reference number 9. FIG. 1 also shows an egg discharge belt 10 and a device 11, disposed between the egg conveyor belts 1 to 4 and the egg discharge belt 10, for transferring the eggs from the egg conveyor belts 1 to 4 to the egg discharge belt 10.

Figure 2:
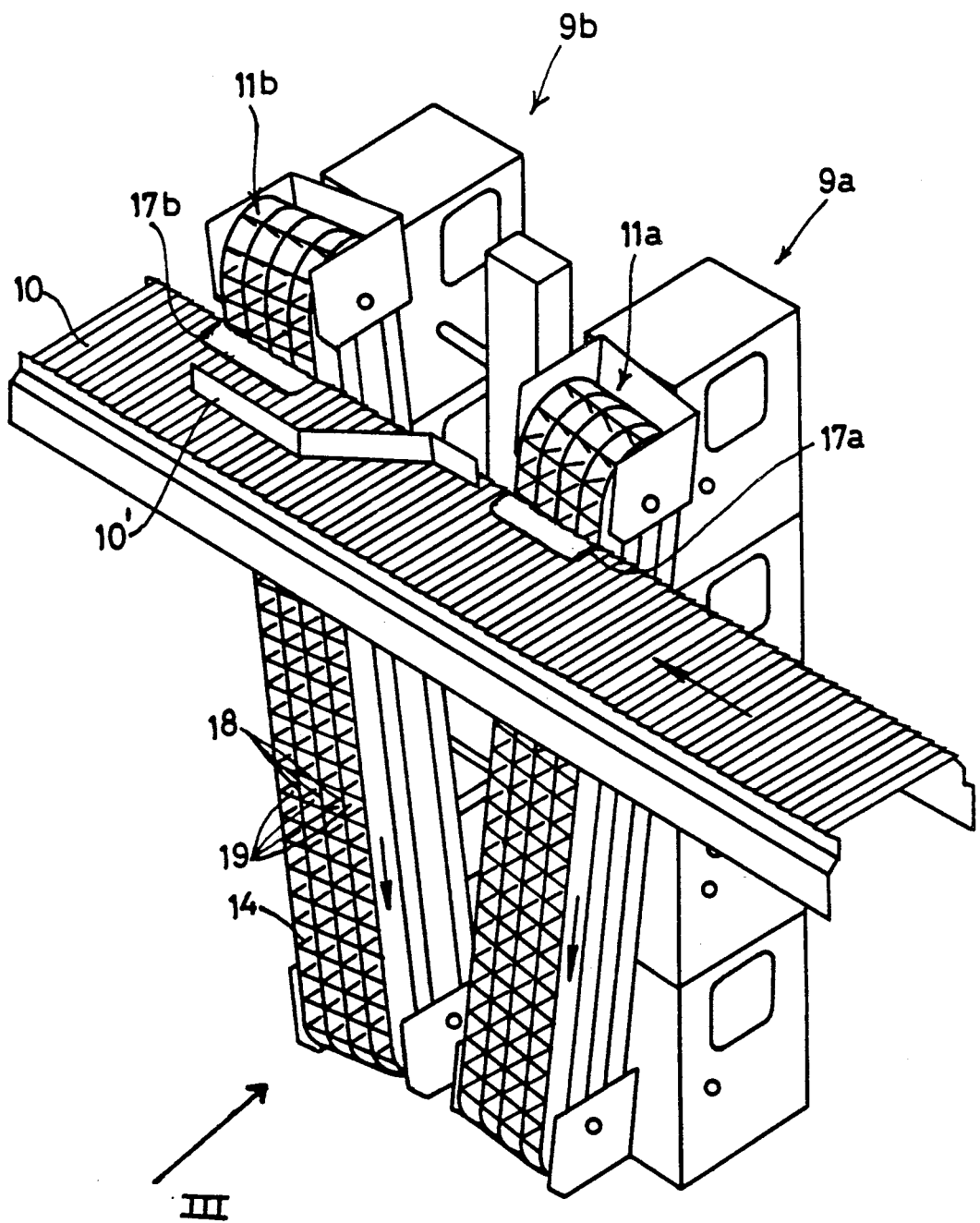
FIG. 2 is a view in perspective of two egg conveyors and an egg discharge belt.

FIG. 2 shows in perspective two adjacent devices 9a and 9b for the further handling of eggs brought in by egg conveyor belts. Also shown are two egg conveyors 11a and 11b and the egg discharge belt 10 on which a known egg guide plate 10' is disposed to prevent eggs coming from egg convetor 11a from coming into contact with eggs coming from egg conveyor 11b.

Figure 3:
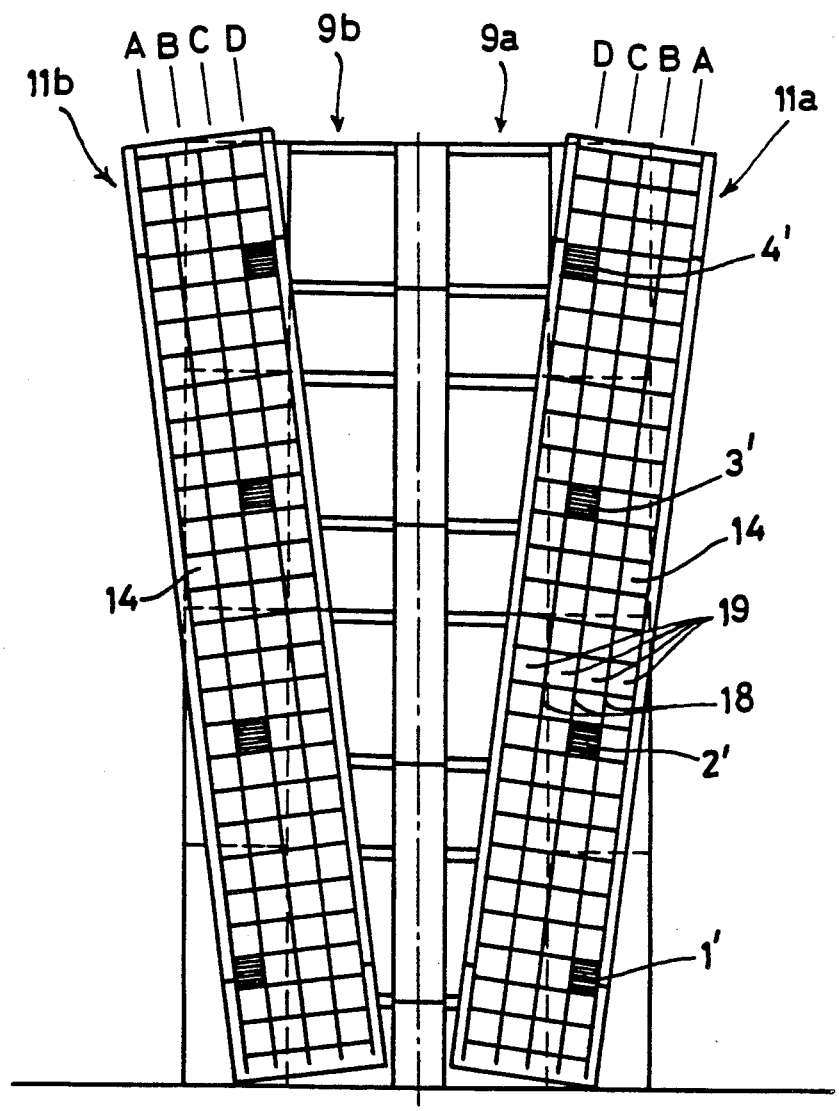
FIG. 3 is a front view of the device of FIG. 2 in the direction of arrow III, in which the egg discharge belt is left out.

The view shown in FIG. 3 in the direction of the arrow III in FIG. 2 also shows the devices 9a and 9b and the egg conveyors 11a and 11b.

In FIGS. 2 and 3 the egg conveyors 11a and 11b are disposed at an angle for reasons which will be explained below.

Each egg conveyor 11 is arranged essentially vertically and designed as an endless conveyor which is guided over reversing rollers 12 and 13 at the top and bottom side. The egg conveyor 11 is provided with egg accommodation elements 14 disposed abutting one after the other in the lengthwise direction of the conveyor and extending over the width of the egg conveyor 11. Viewed in the transverse direction of the egg conveyor 11 the egg accommodation elements 14 are essentially U-shaped and open towards the outside. The first part 15 of the egg conveyor 11 lying at the side of the ends of the egg conveyor belts 1 to 4 moves up during operation, and the second part 16 of the egg conveyor 11 lying at the other side moves downwards past the egg discharge belt 10. Eggs conveyed in by the egg conveyor belts 1 to 4 are accommodated in the egg accommodation elements 14 of the upward moving part 15 of the egg conveyor 11, conveyed over the top reversing roller 12, and at the discharge belt 10 are removed from the accommodation elements 14 of the downward moving part 16 of the egg conveyor. For this, provision is made at the egg discharge belt 10 for a removal plate 17, which is known per se, containing fingers with which the eggs are taken from the accommodation elements 14. The eggs here roll over the plate 17 onto the egg discharge belt 10.

The egg accommodation elements 14 of each egg conveyor 11 are divided by means of separating elements 18 into a number of individual adjacent compartments 19, as shown in FIGS. 2 and 3. The separating elements 18 lie one after the other in the lengthwise direction of the egg conveyor 11, so that a number of adjacent rows A, B, C and D of compartments 19 are formed lying after one another in the lengthwise direction of the egg conveyor 11. The width of the compartments 19 is such that only one egg fits into each compartment 19. In the embodiment shown in FIGS. 2 and 3 four (A, B, C, D) of such rows of compartments 19 are formed in each conveyor 11. This number corresponds to the number of egg conveyor belts 1 to 4 lying above one another.

Through dividing the accommodation elements 14 into separate compartments 19, in which only one eggs fits into each compartment 19, it is ensured that the eggs arriving in the egg accommodation elements cannot touch each other, so that no damage arises through eggs knocking against each other.

Through an arrangement of the egg conveyor 11 which is adapted to the positioning of the egg conveyor belts 1 to 4 it can also be ensured that eggs brought in by a particular egg conveyor belt can only be accommodated in one particular row of compartments 19 lying one after the other in the lengthwise direction of the conveyor 11. In the embodiment shown in FIGS. 2 and 3 the egg conveyor belts 1 to 4 are placed vertically above one another. In the view of FIG. 3 the position of the conveyor belts 1 to 4 is indicated by means of the black squares 1', 2', 3' and 4'. Setting the egg conveyor 11 at an angle in such a way that the egg conveyor belts 1, 2, 3, 4 come to lie opposite the rows of compartments 19 of the egg conveyor 11 indicated by A, B, C and D ensures that the eggs brought in by the egg conveyor belt 1 go only into the compartments of row A, the eggs brought in by the egg conveyor belt 2 go only into the compartments of row B, the eggs brought in by the egg conveyor belt 3 go only into the compartments of row C, and the eggs brought in by the egg conveyor belt 4 go only into the compartments of row D. This makes it possible to count the eggs separately conveyed by each of the egg conveyor belts 1, 2, 3 and 4, by fitting an egg counter at each of the rows A, B, C and D. In addition a high egg collection capacity is achieved through the fact that the eggs conveyed in by the egg conveyor belts 1, 2, 3, 4 are accommodated simultaneously in the adjacent rows of compartments A, B, C, D. Moreover, a free compartment 19 is always available for each egg conveyed in, so that no waiting times occur, and there is no risk of eggs conveyed in by one egg conveyor belt knocking against waiting eggs.

If the egg conveyor belts 1 to 4 are not placed vertically above one another, but are placed in, for example, a so-called pyramid shape, i.e. staggered in the horizontal direction relative to each other, in such a way that when two laying battery units are disposed next to each other (as shown in FIGS. 2 and 3) the top egg conveyor belts 4 of the two batteries are closest together, and the bottom egg conveyor belts 1 lie furthest apart, the position of the egg conveyors 11a and 11b will be adapted in such a way that even there again the eggs conveyed in by the egg conveyor belts 1 to 4 go into the compartments 19 of the rows A, B, C and D. In the special event of the egg conveyor belts 1 to 4 being staggered relative to each other in the horizontal direction over a distance equal to the centre-to-centre distance between two adjacent rows of compartments the egg conveyor will be disposed vertically in the view shown in FIG. 3.

FIGS. 4 to 6 show a part of a preferred embodiment of an egg conveyor 11 of a device according to the invention. The egg conveyor 11 is made up of elements 20 disposed one after the other in the lengthwise direction of the egg conveyor 11 and disposed next to each other and spaced apart in the transverse direction of the egg conveyor, and having separating elements 21 fitted between them. The elements 20 are essentially L-shaped. The L-shaped elements 20 and the separating elements 21 are hingedly connected to each other in the lengthwise direction of the egg conveyor 11 as links of a link chain by means of hinge pins 22 extending at least over the width of the egg conveyor 11.

Each L-shaped element is provided at the free end of one of the legs 23 with a bushing 24 which is at right angles to the plane of the element and which extends towards one side of the L-shaped element and is provided with a bore formed therethrough with a slightly larger diameter than the diameter of the hinge pins 22. At the transition from one leg 23 of the L-shaped element 20 to the other leg 25 of the L-shaped element, the L-shaped element is also provided with a bushing 26 which is at right angles to the plane of the element and which extends at the other side of the L-shaped element and is also provided with a bore formed therethrough with a diameter which is slightly greater than the diameter of the hinge pins 22. The free end part 27 of the leg 23 of the element 20 is staggered towards the one side of the element 20 along a distance which is equal to the thickness of the L-shaped element 20. This means that the legs 23 of the L-shaped elements 20 can lie precisely one after the other in the lengthwise direction of the egg conveyor 11 when they are connected to each other by means of the hinge pins 22 projecting through the bores in the bushings 24 and 26.

The separating elements 21 comprise a base part 28 which is essentially the same shape as the one leg 23 of the L-shaped elements 20, and a grille-type part 29 which is integral with said base part. Like the L-shaped elements 20, the separating elements 21 are provided with bushings 30 and 31 in which bores are provided with a slightly larger diameter than the diameter of the hinge pins 22. The separating elements also lie precisely one after the other in the lengthwise direction of the egg conveyor 11.

The egg conveyor 11 of the device shown in FIGS. 2 and 3 is made up of L-shaped elements 20 and separating elements 21, a chain made up of separating elements 21 always being situated at both sides next to two adjacent chains made up of L-shaped elements 20. In this way compartments 19 are always formed by the L-shaped elements 20 and the separating elements 21 with such dimensions that only one egg 32 fits into each compartment 19.

It is pointed out that the part of the egg conveyor 11 shown in FIGS. 4 to 6 is a part of the first upward moving part 15 of the egg conveyor 11. A part of the second, downward moving part 16 of the egg conveyor would have to be shown exactly upside down relative to FIGS. 4 to 6.

As can be seen in FIG. 6, the L-shaped elements 20 are provided at the sides coming into contact with the eggs with parts 33 and 34 which are spring-loaded into the plane of the L. The spring action is obtained by providing a through slit 35, 36 closely along the edges of the L-shaped element 20, in such a way that only a very narrow strip of material is present between the slit 35, 36 and the corresponding edge of the L-shaped elements.

The L-shaped elements 20 and the separating elements 21 are preferably made of plastic. Through the choice of the material and the presence of the spring-loaded parts 33 and 34, the chance of damage to eggs arriving in the compartments 19 is extremely small.

As can be seen in FIG. 6, the two side edges of the leg 25 of each L-shaped element 20 are slightly curved in the direction of the central axis of said leg. This ensures that an egg 32 lying in a compartment 19 rolls to the lowest point and remains there, which means that damage to the egg through rolling to and fro is prevented.

Figure 8:
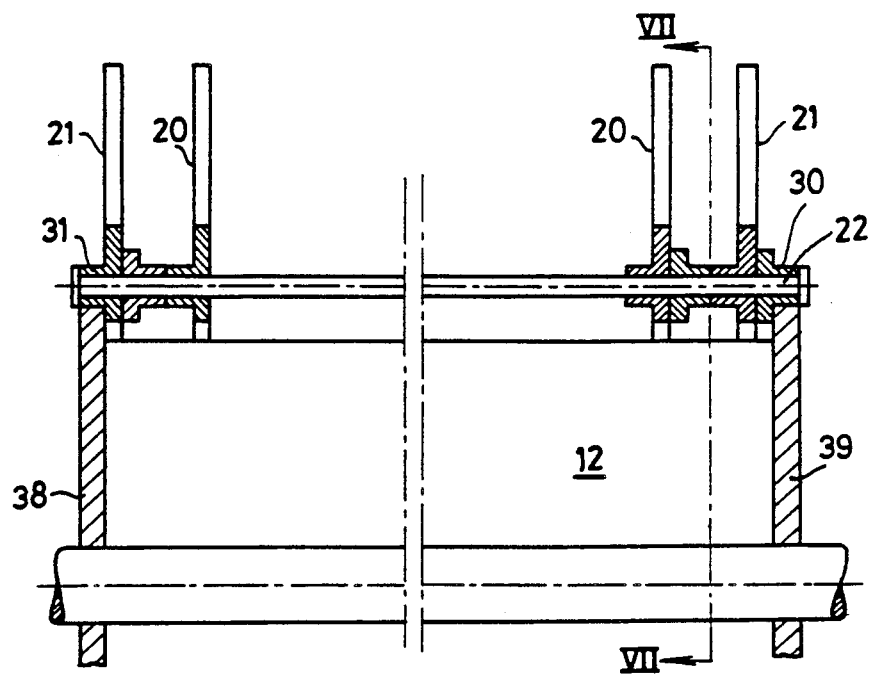
FIG. 8 is a view along the line VIII—VIII in FIG. 7.
Figure 7:
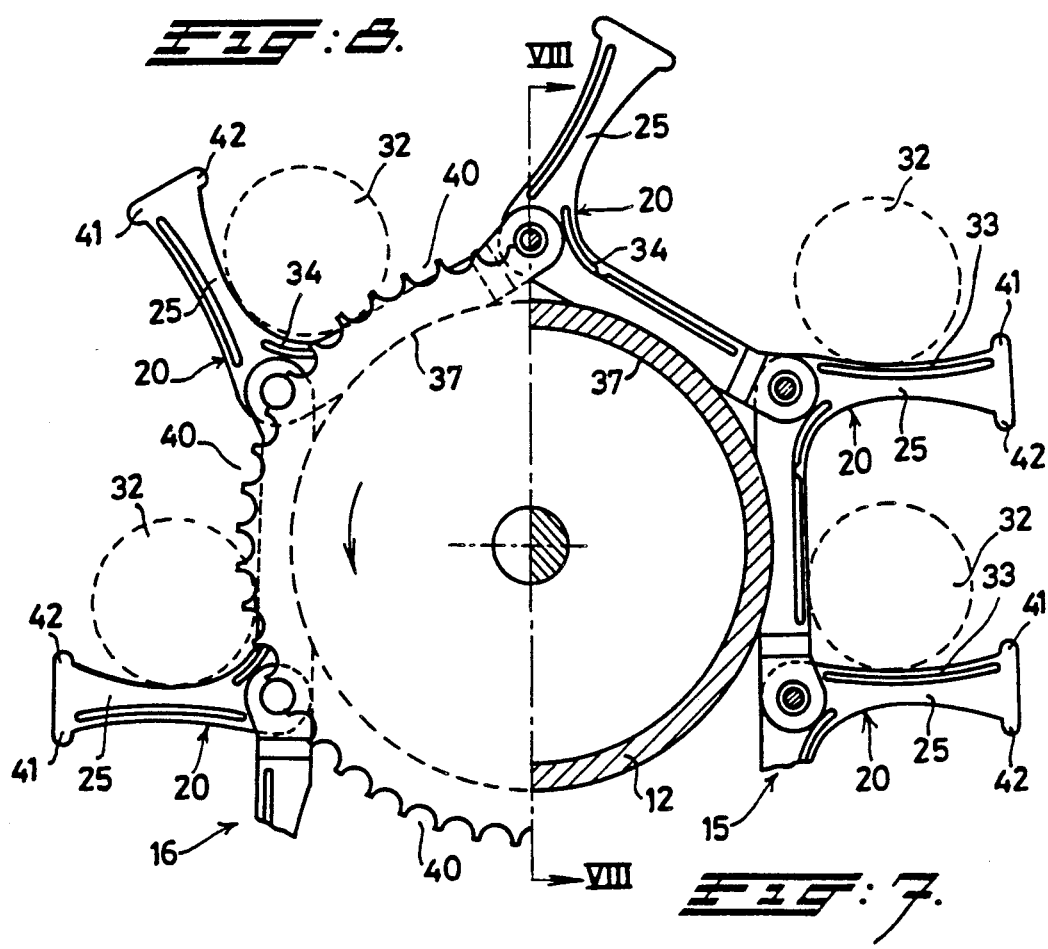
FIG. 7 is a view in the axial direction and partially in cross-section along the line VII—VII in FIG. 8 of the top reversing roller of the egg conveyor.

The reversing rollers 12 and 13, over which the egg conveyor 11 is guided, support the egg conveyor 11 over the entire width. FIGS. 7 and 8 show the top reversing roller 12 and a part of the egg conveyor 11 running over it. The side of the L-shaped elements 20 and the separating elements 21 facing the reversing rollers 12, 13 is provided with a concave part 37 whose radius of curvature is equal or virtually equal to the external radius of the reversing rollers 12, 13. The L-shaped elements 20 and the separating elements 21 consequently rest over a relatively large area on the reversing rollers 12, 13, and the egg conveyor 11 is very well supported by these rollers over the entire width of the reversing rollers 12, 13.

The reversing rollers 12, 13 are provided at the ends with concentric flat discs 38, 39 with a slightly larger diameter than the reversing rollers 12, 13. At the outer periphery the discs 38, 39 are provided with recesses 40 for the accommodation of end parts of the hinge pins 22 projecting beyond the side edges of the egg conveyor 11, or the bushes 30, 31 of the separating elements 21 on the outsides of the egg conveyor 11 projecting beyond the side edges of the egg conveyor 11. The latter is shown in FIGS. 7 and 8.

FIG. 7 shows how the egg conveyor 11 runs over the top reversing roller 12. Due to the fact that the reversing rollers 12, 13 are provided on both sides with discs 38 and 39, whereby the egg conveyor 11 falls at both sides, at the hinges between the L-shaped elements 20 and the supporting elements 21, into the recesses 40 provided on the periphery of the discs 38, 39, the conveyor can be driven simply, while very regular and smooth running of the conveyor 11 is also ensured.

FIG. 7 also shows how on the movement of the egg conveyor 11 over the top reversing roller 12 an egg 32 present in a compartment 19 moves in this compartment 19. In the upward moving part 15 of the egg conveyor 11 the eggs 32 lie on the legs 25 of the L-shaped elements 20 extending towards the outside. When the particular L-shaped elements 20 have passed the highest point of the egg conveyor 11 an egg present in the top compartment 19 will roll to the other side of the compartment 19 and come to rest on the outward extending legs 25 of the adjacent L-shaped elements 20. Due to the special curved shape of the L-shaped elements 20 this movement of the egg will take place smoothly, while the presence of the spring-loaded elements 34 means that the chance of damage to the eggs is extremely slight. In order to prevent the eggs from rolling out of the compartments, the outward extending legs 25 of the L-shaped elements 20 are provided at the end with upright parts 41 and 42.

The various parts of the egg conveyor 11 and the reversing rollers 12, 13 are preferably made of plastic.

Figure 8B:
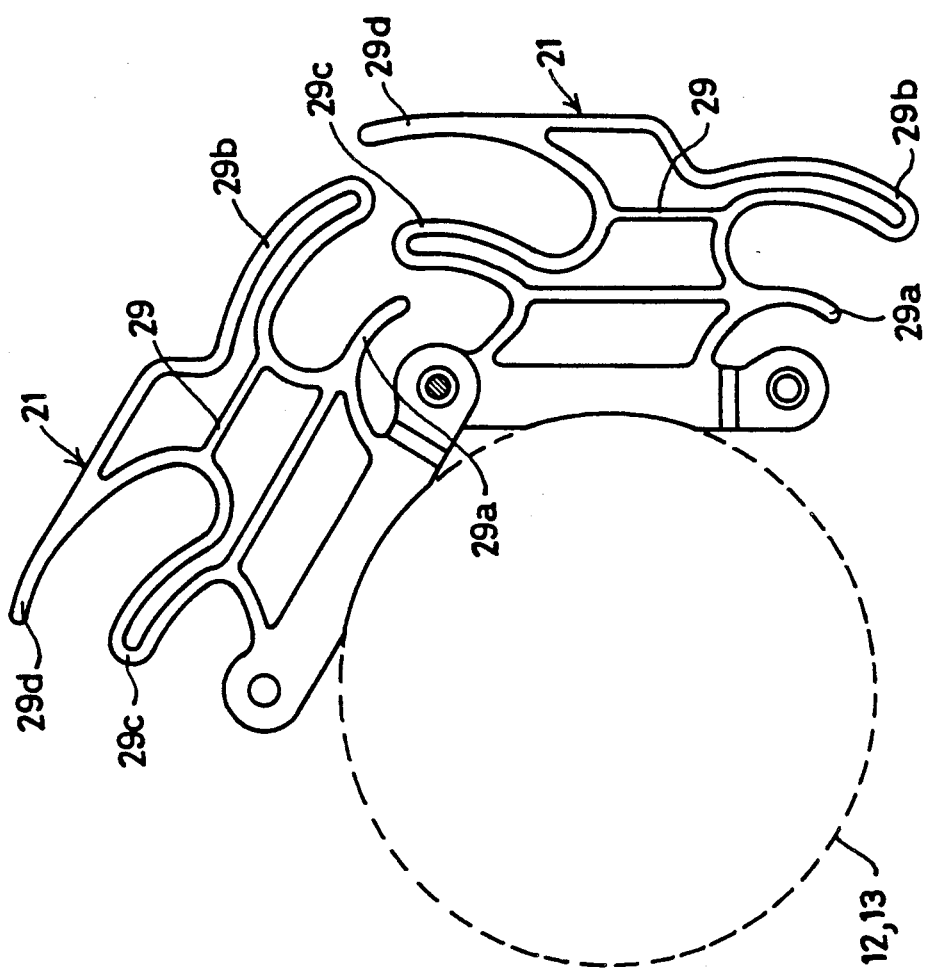
FIGS. 8a, b show an alternative embodiment of a separating element of the egg conveyor.
Figure 8A:
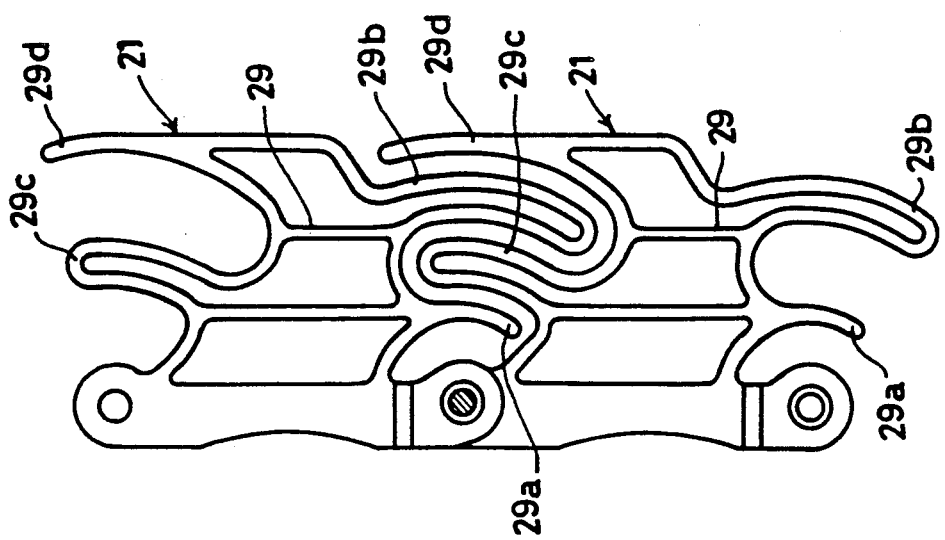

The grille-type part 29 of the separating elements 21 may have a shape as shown in FIG. 5. Preferably, the grille-type part 29 has a shape as shown in FIG. 8a and comprises curved FIGS. 29a, 29b, 29c and 29d, the centre of curvature lying at the hinge point between two adjacent separating elements 21. The FIGS. 29a and 29b of a separating element 21 extend between the FIGS. 29c and 29d of an adjacent separating element. It is thereby prevented that an egg 32 lying in a compartment 19 is trapped between two adjacent separating elements 21 when the egg conveyor moves over a reversing roller 12, 13 and these two separating elements 21 are at angle relative to one another, as shown in FIG. 8b, and is broken when the separating elements 21 move back to their relative position shown in FIG. 8a.

The eggs are taken out of the compartments 19 at the discharge belt 10 by means of a slanting removal plate 17 which is disposed between the discharge belt 10 and the conveyor 11, and which is provided with fingers which project between the L-shaped elements 20 and the separating elements 21. Such a plate 17 is known in principle and has already been described in the earlier mentioned U.S. Pat. No. 4,199,051.

Figure 9:
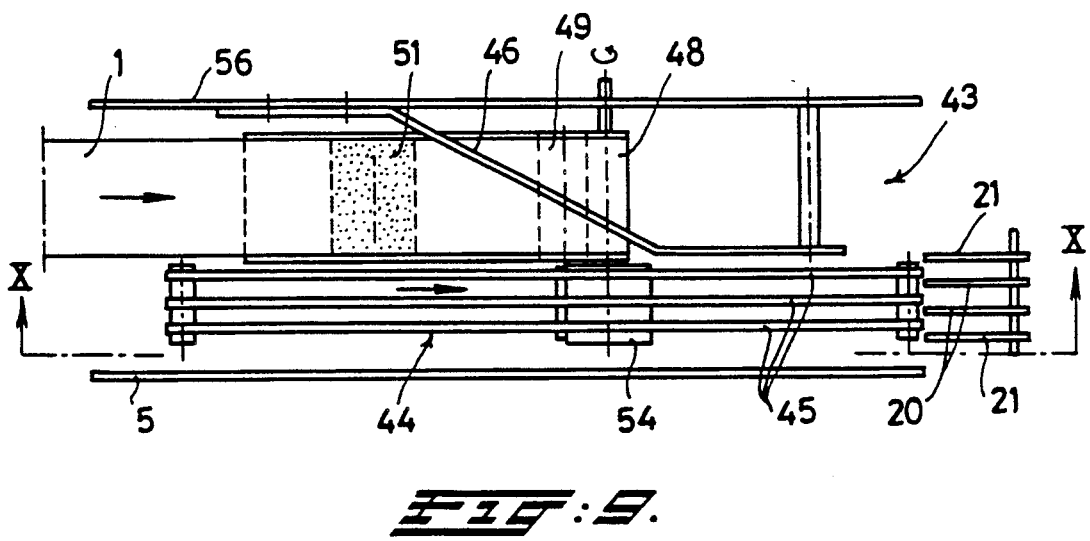
FIG. 9 is a top view of a transfer unit placed between an egg conveyor belt and the egg conveyor.
Figure 10:
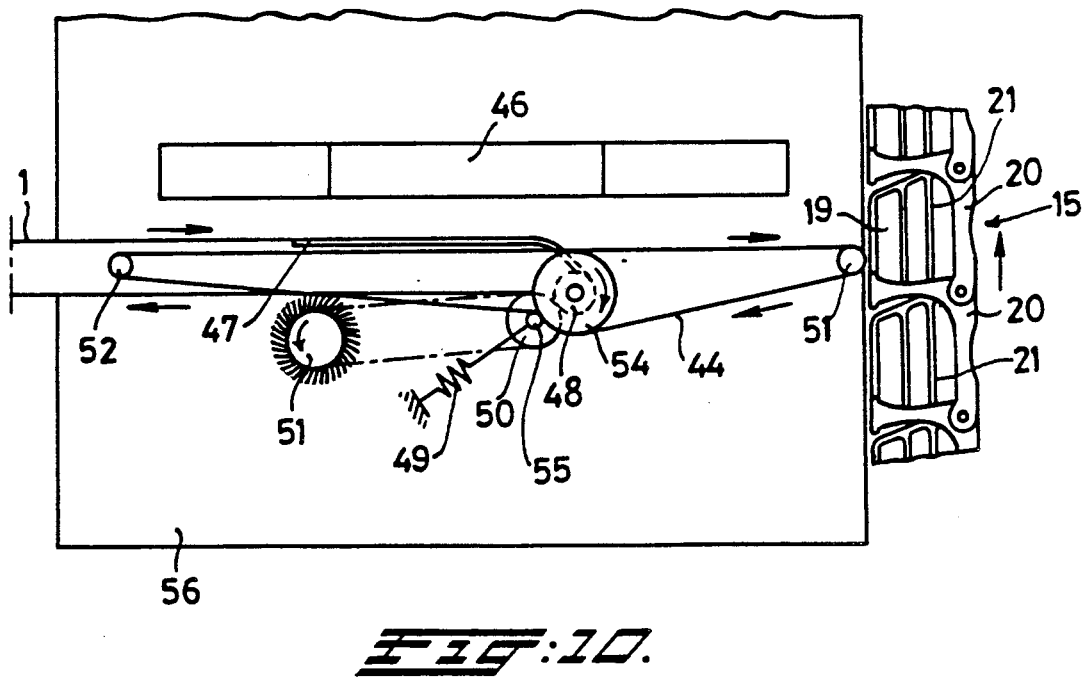
FIG. 10 is a view along the line X—X in FIG. 9.

An egg transfer unit 43, which is shown schematically for the egg conveyor belt 1 in FIGS. 9 and 10, is disposed between the end of each egg conveyor belt 1, 2, 3, 4 and the egg conveyor 11. This egg transfer unit 43 comprises a relatively short conveyor belt 44 which comprises a number of adjacent endless belts 45. The conveyor belt 44 runs next to and parallel to the end part of the egg conveyor belt 1. The end of the conveyor belt 44 situated at the side of the egg conveyor 11 connects to the L-shaped elements 20 of the egg conveyor, of which a part of the upward moving first part 15 is shown in FIG. 10. The transfer unit 43 also has a guide plate 46 which is at an angle relative to the lengthwise direction of the egg conveyor belt 1, and which ensures that eggs brought in by the egg conveyor belt 1 are guided in the lateral direction towards the intermediate conveyor belt 44. The guide plate 46 lies a particular distance above the egg conveyor belt 1. The distance from the egg conveyor belt 1 is such that wind eggs, feathers and dirt lying on the egg conveyor belt 1 can move through under the guide plate 46 and fall down at the end of the egg conveyor belt 1. In order to obtain a definite distance between the guide plate 46 and the egg conveyor 1, the end part of the egg conveyor 1 is guided over a supporting plate 47.

It can be seen from FIG. 10 that the egg conveyor belt 1 is guided over a reversing roller 48 and then through between the reversing roller 48 and a pressure roller 50 pressed by a spring 49 against the reversing roller 48 and over a brush roller 51. The reversing roller is driven externally, and the brush roller 51 is driven by the pressure roller 50. The brush roller 51 ensures that the surface of the egg conveyor belt 1 is brushed clean.

The belts 45 of the intermediate conveyor belt 44 are guided over reversing rollers 52 and 53 and over supporting roller 54 and a guide roller 55 which is mounted on the same shaft as the pressure roller 50, but is freely rotatable relative to the pressure roller 50. The intermediate conveyor belt is driven by means of the supporting roller which is fixed to the reversing roller 48, and which is mounted on the same shaft as the reversing roller 48. The diameter of the supporting roller 54 is approximately twice the diameter of the reversing roller 48, so that the speed of the intermediate conveyor belt 44 is about twice the speed of the egg conveyor belt 1. As a result, during the passage of eggs from the egg conveyor belt 1 and to the intermediate conveyor belt 44 the eggs are moved apart, so that a certain space is produced between the eggs, and two eggs are prevented from arriving virtually simultaneously at the end of the intermediate conveyor belt 44 and knocking against each other. The whole transfer unit 43 is supported in two side plates 56 and 57.

With the transfer unit 43 a separation of the eggs and dust, dirt, feathers and wind eggs lying on the egg conveyor belt 1 is achieved, so that the eggs arrive clean in the egg conveyor 11. Any feathers still carried along with the eggs can fall down between the belts 45 of the intermediate conveyor belt 44.

Egg counters can be fitted near the top reversing roller 12 of the egg conveyor 11, one for each row A, B, C and D of compartments 19 in order to count the number of eggs brought in by a particular egg conveyor belt 1, 2, 3 and 4. The egg counters can be of any known type. The element of the egg counters which comes into contact with the eggs is preferably provided with fingers which extend between the outward extending legs 25 of the L-shaped elements 20. The egg counters are not shown in the drawing.

The device according to the invention produces a relatively simple and cheap system for the collection of eggs, which can be used both for egg conveyor belts lying vertically above one another and for those lying at an angle above one another, which has a large capacity, and in which each egg is handled separately and in a gentle manner. The design of the various parts is such that the chance of damage to the eggs is minimized.

What is claimed is:

1. A device for the transfer of eggs from a number of egg supply belts disposed one above another to an egg discharge belt, comprising:

at least two reversing mechanisms for guiding an egg conveyor;

an essentially vertically arranged endless egg conveyor which is guided over the reversing mechanisms at the top and bottom of the egg conveyor and which is provided with a plurality of egg accommodation elements disposed abutting one after the other in the lengthwise direction of the egg conveyor and being essentially U-shaped, viewed in the transverse direction of the egg conveyor, said egg accommodation elements being open towards the egg supply belts and towards the egg discharge belt, said egg conveyor further comprising a plurality of separating elements which cooperate with the accommodation elements to divide the egg conveyor along both the width and length thereof into a number of individual adjacent compartments, the separating elements lying one after the other in the lengthwise direction of the egg conveyor, the separating elements having bores formed therethrough adjacent opposite ends thereof, and wherein the are dimensioned the compartments being such that only one egg fits into each compartment.

2. The device of claim 1, wherein the egg accommodation elements comprise essentially L-shaped elements disposed in groups, plural L-shaped elements being disposed next to each other in the transverse direction of the egg conveyor, the separating elements being interposed between adjacent groups of L-shaped elements, each of the L-shaped elements and the separating elements being hingedly connected to other elements in the lengthwise direction of the egg conveyor as links of a link chain, by means of hinge pins extending a distance at least equal to the width of the egg conveyor and which pass through the bores in the L-shaped elements and the separating elements.

3. The device of claim 2, wherein the reversing mechanisms are reversing rollers, which are rotatable about their axis and which support the egg conveyor over the entire width thereof.

4. The device of claim 3, wherein each of the L-shaped elements and the separating elements have a side facing the reversing rollers which defines a concave part with a radius of curvature which is substantially equal to an external radius of one of the reversing rollers.

5. The device of claim 2, wherein each of the reversing rollers is provided at the outer ends thereof with flat concentric round sprocket discs which have a slightly larger diameter than the reversing rollers, and at the outer periphery thereof, the sprocket discs are provided with recesses for the accommodation of the hinge pins.

6. The device of claim 2, wherein each of the L-shaped elements is provided with parts which are spring-loaded in the main plane of the L-shaped elements.

7. The device of claim 2, wherein each L-shaped element has an outwardly extending leg having two side edges which are curved a concave direction.

8. A device for collecting eggs, comprising a number of egg supply belts which are vertically spaced with respect to one another, an egg discharge belt, and a transfer device disposed between the egg conveyor belts and the egg discharge belt for transferring eggs from the egg conveyor belts to the egg discharge belt, said transfer device comprising at least two reversing mechanisms for guiding an egg conveyor, an essentially vertically arranged endless egg conveyor having a top and bottom which are guided over the reversing mechanisms, and which has a first part which can move up past ends of the egg supplier belts, and a second part which can move down past the egg discharge belt, the egg conveyor having an inside and an outside and being provided with a plurality of egg accommodation elements disposed abutting one after the other in the lengthwise direction of the egg conveyor and being essentially U-shaped, viewed in the transverse direction of the egg conveyor, said egg conveyor comprising a plurality of separating elements which cooperate with the egg accommodation elements to divide the vertical conveyor into a number of individual adjacent compartments, the separating elements lying one after the other in the lengthwise direction of the egg conveyor, the compartments being dimensioned such that only one egg fits into each compartment, said egg conveyor being arranged in such a way that the eggs fed in by a particular egg conveyor belt can be accommodated in only one specific row of compartments lying one after the other in the lengthwise direction of the egg conveyor.

9. The device of claim 8, further comprising an egg transfer unit fitted between is end of each egg supply belt and the egg conveyor, said unit comprising a relatively short intermediate conveyor belt which is made up of a number of adjacent endless belts and which runs next to and parallel to the end of the egg supply belt, said unit having an end situated at the side of the egg conveyor which cooperates with the first part of the egg conveyor, as well as a guide plate situated above the egg supply belt and disposed at an angle relative to the lengthwise direction of the egg supply belt, said guide plate being operative to guide the eggs brought in by the egg supply belt in a lateral direction onto the intermediate conveyor belt.

10. The device of claim 9, wherein during operation of the device the speed of the intermediate supply belt is greater than that of the egg conveyor belt, preferably approximately twice the speed.

11. A device for collecting eggs, comprising a number of egg supply belts which are vertically spaced with respect to one another, an egg discharge belt, and a transfer device disposed between the egg supply belts and the egg discharge belt for transferring eggs from the egg supply belts to the egg discharge belt, said transfer device comprising at least two reversing mechanism for guiding an egg conveyor, an essentially vertically arranged endless egg conveyor which at the top and bottom side thereof is guided over the reversing mechanisms, and which has a first part which is moveable up past the ends of the egg conveyor belts, and a second part which is moveable down past the egg discharge belt, the egg conveyor having an inside and an outside and being provided with a plurality of egg accommodation elements disposed abutting one after the other in the lengthwise direction of the egg conveyor said egg conveyor comprising a plurality of separating elements which cooperate with the egg accommodation elements to divide the egg conveyor into a number of individual adjacent compartments, the separating elements lying one after the other in the lengthwise direction of the egg conveyor, the compartments being dimensioned such that only one egg fits into each compartment, and said egg conveyor being arranged in such a way that the eggs fed in by a particular egg conveyor belt can be accommodated in only one specific row of compartments lying one after the other in the lengthwise direction of the egg conveyor; wherein the lengthwise direction of the egg conveyor lies slanting at an angle relative to the vertical, the angle between the lengthwise direction of the egg conveyor and the vertical being such that the eggs of two egg conveyor belts lying one above the other go into adjacent rows of compartments of the egg conveyor.

12. An apparatus for transferring eggs from a plurality of substantially horizontal conveyor belts, which are vertically spaced apart from one another, to an egg discharge belt, comprising an endless loop chain conveyor, the chain conveyor comprising:

a. a plurality of egg accommodation elements, each egg support element comprising a first leg which is pivotally connected at each end thereof to another element of the chain conveyor, each egg accommodation element further comprising a second leg which extends substantially perpendicularly outwardly from the first leg and which has an egg retaining bump formed thereon at an outermost extension thereof; and b. a plurality of separating elements, each of the separating elements having a substantially vertical flattened section which extends outwardly thereon to define a partition, the egg support elements and separating elements cooperating to define a plurality of compartments which are dimensioned such that only one egg fits into each compartment.

13. The apparatus of claim 12 further comprising means for moving the claim conveyor in an endless loop.

14. The apparatus of claim 12 further comprising means for transferring eggs from the chain conveyor to the egg discharge belt, means for moving the chain conveyor in an endless loop, and means for transferring eggs from the supply belts to the chain conveyor.

15. The apparatus of claim 12 wherein the chain conveyor is displaced at an angle relative to the vertical.

* * * * *